United States Patent
Julien et al.

(10) Patent No.: US 10,393,014 B2
(45) Date of Patent: *Aug. 27, 2019

(54) ENGINE ASSEMBLY WITH EXHAUST PIPE NOZZLE

(71) Applicant: Pratt & Whitney Canada Corp., Longueuil (CA)

(72) Inventors: Andre Julien, Ste-Julie (CA); Serge Dussault, Ste-Julie (CA); Jade Bilodeau, Montreal (CA); Renaud Besner, Montreal (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 193 days.

This patent is subject to a terminal disclaimer.

(21) Appl. No.: 15/671,221

(22) Filed: Aug. 8, 2017

(65) Prior Publication Data

US 2017/0362998 A1    Dec. 21, 2017

Related U.S. Application Data

(63) Continuation of application No. 14/740,889, filed on Jun. 16, 2015, now Pat. No. 9,759,128.

(51) Int. Cl.
    *F02C 3/06*      (2006.01)
    *F01C 1/22*      (2006.01)
    (Continued)

(52) U.S. Cl.
    CPC .................. *F02C 3/06* (2013.01); *F01C 1/22* (2013.01); *F01C 11/002* (2013.01);
    (Continued)

(58) Field of Classification Search
    CPC ...... F01C 1/00; F01C 1/22; F02C 5/06; F01N 5/04; F02B 53/00
    See application file for complete search history.

(56) References Cited

U.S. PATENT DOCUMENTS

| 1,901,873 A | 3/1933 | Holzwarth |
| 2,625,006 A | 1/1953 | Lundquist |

(Continued)

FOREIGN PATENT DOCUMENTS

| AN | 104329148 B | 2/2015 |
| AU | 2013101323 | 11/2013 |

(Continued)

OTHER PUBLICATIONS

E.F. Pierce and H.W. Welsh, Wright Aeronautical Corp., Engine Compounding for Power and Efficiency, SAE National Aeronautic Meeting, Los Angeles, Calif., Oct. 2, 1947.

(Continued)

*Primary Examiner* — Mark A Laurenzi
*Assistant Examiner* — Shafiq Mian
(74) *Attorney, Agent, or Firm* — Norton Rose Fulbright Canada LLP

(57) ABSTRACT

An engine assembly including an internal combustion engine, an impulse turbine, and an exhaust pipe providing fluid communication between the exhaust port of the internal combustion engine and the flow path of the turbine. The exhaust pipe terminates in a nozzle. A ratio Vp/Vd between the pipe volume Vp and the displacement volume Vd of the internal combustion engine is at most 1.5. A minimum value of a cross-sectional area of the exhaust pipe is defined at the nozzle. In one embodiment, a ratio An/Ae between the minimum cross-sectional area An and the cross-sectional area Ae of the exhaust port of the internal combustion engine is at least 0.2. A method of compounding at least one internal combustion engine is also discussed.

23 Claims, 5 Drawing Sheets

(51) Int. Cl.
| | | |
|---|---|---|
| *F01C 11/00* | (2006.01) | |
| *F02B 37/00* | (2006.01) | |
| *F02B 53/04* | (2006.01) | |
| *F02C 6/12* | (2006.01) | |
| *F02B 39/02* | (2006.01) | |
| *F02C 3/00* | (2006.01) | |
| *F02C 5/02* | (2006.01) | |
| *F01L 1/02* | (2006.01) | |
| *F02C 5/00* | (2006.01) | |

(52) U.S. Cl.
CPC ............ *F01C 11/008* (2013.01); *F01L 1/026* (2013.01); *F02B 37/00* (2013.01); *F02B 39/02* (2013.01); *F02B 53/04* (2013.01); *F02C 3/00* (2013.01); *F02C 5/00* (2013.01); *F02C 5/02* (2013.01); *F02C 6/12* (2013.01); *Y02T 10/144* (2013.01); *Y02T 10/17* (2013.01)

(56) References Cited

U.S. PATENT DOCUMENTS

| | | | |
|---|---|---|---|
| 3,918,413 A | 11/1975 | Eiermann et al. | |
| 3,945,200 A | 3/1976 | Wright | |
| 3,993,029 A * | 11/1976 | Eiermann | F01C 1/22 |
| | | | 123/203 |
| 4,019,324 A | 4/1977 | Coxon | |
| 4,037,412 A * | 7/1977 | Jones | F02B 37/00 |
| | | | 123/206 |
| 4,078,529 A | 3/1978 | Warwick | |
| 4,135,485 A * | 1/1979 | Loyd, Jr. | F02B 53/00 |
| | | | 123/198 F |
| 4,291,535 A | 9/1981 | Goloff | |
| 4,815,282 A | 3/1989 | Wilkinson et al. | |
| 5,079,913 A | 1/1992 | Kishishita | |
| 5,138,840 A | 8/1992 | Oguchi et al. | |
| 5,692,372 A | 12/1997 | Whurr | |
| 6,840,045 B2 | 1/2005 | Kusase | |
| 7,775,044 B2 * | 8/2010 | Julien | F02C 3/055 |
| | | | 60/614 |
| 7,954,320 B2 | 6/2011 | Ellensohn et al. | |
| 7,987,673 B2 | 8/2011 | Kley et al. | |
| 8,037,686 B2 | 10/2011 | Lasker | |
| 8,333,073 B2 | 12/2012 | Giselmo et al. | |
| 9,181,863 B2 | 11/2015 | Thomassin et al. | |
| 9,194,232 B2 | 11/2015 | Bolduc et al. | |
| 9,228,491 B2 | 1/2016 | Taylor | |
| 9,945,332 B2 | 4/2018 | Roth | |
| 2004/0177837 A1 * | 9/2004 | Bryant | F02B 29/0412 |
| | | | 123/559.1 |
| 2005/0233853 A1 | 10/2005 | Suebsinskuichai | |
| 2007/0240415 A1 | 10/2007 | Julien et al. | |
| 2008/0169246 A1 | 7/2008 | Japikse | |
| 2012/0227397 A1 | 9/2012 | Willi et al. | |
| 2013/0025565 A1 * | 1/2013 | Thomassin | F01C 11/002 |
| | | | 123/200 |
| 2013/0213048 A1 | 8/2013 | Stuecki | |
| 2014/0020380 A1 * | 1/2014 | Thomassin | F02C 6/20 |
| | | | 60/605.1 |
| 2014/0020381 A1 | 1/2014 | Bolduc et al. | |
| 2014/0261292 A1 * | 9/2014 | Thomassin | F01C 1/22 |
| | | | 123/202 |
| 2015/0000269 A1 | 1/2015 | Zhuge et al. | |
| 2015/0275749 A1 | 10/2015 | Thomassin | |

FOREIGN PATENT DOCUMENTS

| | | |
|---|---|---|
| CA | 2821497 | 1/2014 |
| CN | 104329148 | 2/2015 |
| DE | 102012220733 | 5/2014 |
| DE | 102012220733 A1 | 5/2014 |
| EP | 2011962 | 1/2009 |
| EP | 2022964 | 2/2009 |
| EP | 2687675 | 1/2014 |
| EP | 2778342 | 9/2014 |
| GB | 328263 | 4/1930 |
| GB | 511331 | 8/1939 |
| GB | 934403 | 8/1963 |
| JP | S6285123 | 4/1987 |
| JP | H08260995 | 10/1996 |
| JP | H08260996 | 10/1996 |
| JP | 4587923 | 4/2007 |
| JP | 04587923 B2 | 11/2010 |
| SE | 507506 | 6/1998 |
| SE | 507506 C2 | 6/1998 |

OTHER PUBLICATIONS

L. Richard Turner and Leland G. Desmon, Performance of Blowdown Turbine Driven by Exhaust Gas of Nine-Cylinder Radial Engine, Report No. 786, National Advisory Committee for Aeronautics, p. 243 to 253.

Anthony Giampaolo, Gas Turbine Handbook, Principles and Practices, Third Edition.

\* cited by examiner

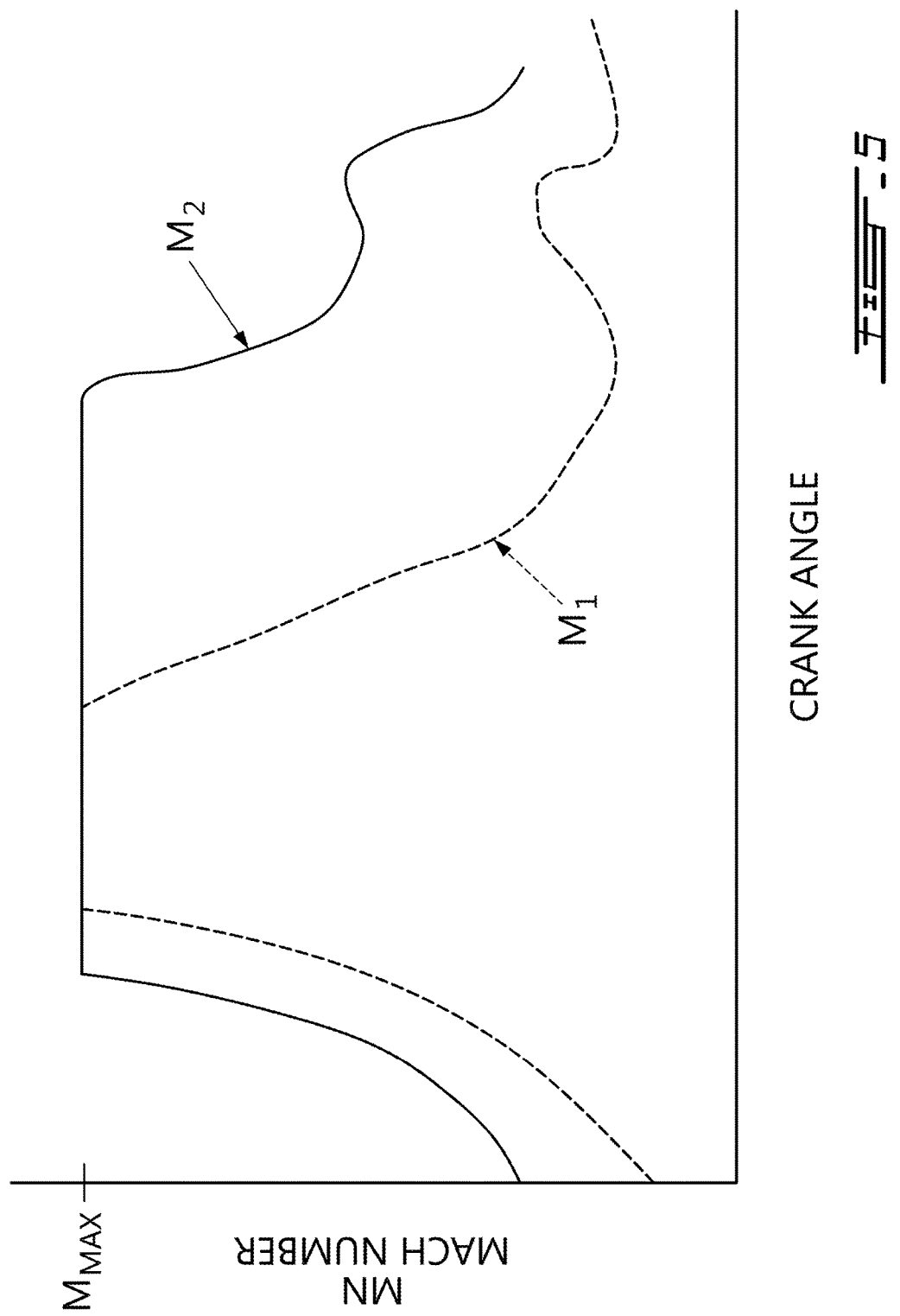

ENGINE ASSEMBLY WITH EXHAUST PIPE NOZZLE

CROSS-REFERENCE TO RELATED APPLICATIONS

This application is a continuation of U.S. application Ser. No. 14/740,889 filed Jun. 16, 2015, the entire contents of which are incorporated by reference herein.

TECHNICAL FIELD

The application relates generally to engine assemblies and, more particularly, to such engine assemblies including one or more internal combustion engine(s).

BACKGROUND OF THE ART

Compound engine assemblies including an impulse turbine with a reciprocating engine core are known and typically include long exhaust pipes with a relatively high pipe volume which is sufficient to maintain the pressure of the exhaust pulses at an acceptable level corresponding to an acceptable flow speed at the connection with the impulse turbine. However, longer exhaust pipes typically lead to greater power losses from the exhaust pulse and accordingly, less recovery in the compound turbine.

SUMMARY

In one aspect, there is provided an engine assembly comprising: an internal combustion engine having a working chamber of variable volume, the variable volume varying between a minimum volume and a maximum volume with a difference between the maximum and minimum volumes defining a displacement volume Vd; a turbine configured as an impulse turbine having a pressure based reaction ratio of at most 0.25, the turbine having a circumferential array of rotor blades extending across a flow path; and an exhaust pipe having a pipe volume Vp, the exhaust pipe providing fluid communication between an exhaust port of the internal combustion engine and the flow path of the turbine, the exhaust pipe terminating in a nozzle communicating with a portion of the flow path located upstream of the rotor blades; wherein a ratio Vp/Vd between the pipe volume Vp and the displacement volume Vd of the internal combustion engine is at most 1.5; and wherein a minimum value of a cross-sectional area of the exhaust pipe is defined at the nozzle.

In another aspect, there is provided an engine assembly comprising: an internal combustion engine having a working chamber of variable volume, and having an inlet port and an exhaust port in communication with the working chamber, the exhaust port having a cross-sectional area Ae; a turbine configured as an impulse turbine having a pressure based reaction ratio of at most 0.25, the turbine having a circumferential array of rotor blades extending across a flow path; and an exhaust pipe providing fluid communication between the exhaust port of the internal combustion engine and the flow path of the turbine, the exhaust pipe terminating in a nozzle communicating with a portion of the flow path located upstream of the rotor blades; wherein the nozzle includes a portion of reduced cross-sectional area with respect to a remainder of the exhaust pipe, the nozzle defining a minimum cross-sectional area An of the exhaust pipe; and wherein a ratio An/Ae between the minimum cross-sectional area An and the cross-sectional area Ae of the exhaust port is at least 0.2.

In a further aspect, there is provided a method of compounding an internal combustion engine, the method comprising: providing a turbine configured as an impulse turbine having a pressure based reaction ratio of at most 0.25; drivingly engaging the internal combustion engine and the turbine to a common load; circulating exhaust gas from an exhaust port of the internal combustion engine through a first portion of an exhaust pipe having a first cross-sectional area and then through a nozzle of the exhaust pipe having a second cross-sectional area smaller than the first cross-sectional area; and circulating the exhaust gas from the nozzle to an inlet of the turbine, including directing the exhaust gas onto blades of the turbine.

DESCRIPTION OF THE DRAWINGS

Reference is now made to the accompanying figures in which:

FIG. 5 is a schematic graph of flow speed variation with respect to crank angle, for the compound engine including exhaust pipes with a constant cross-sectional area and for the compound engine including exhaust pipes with nozzles.

DETAILED DESCRIPTION

Figure 1:
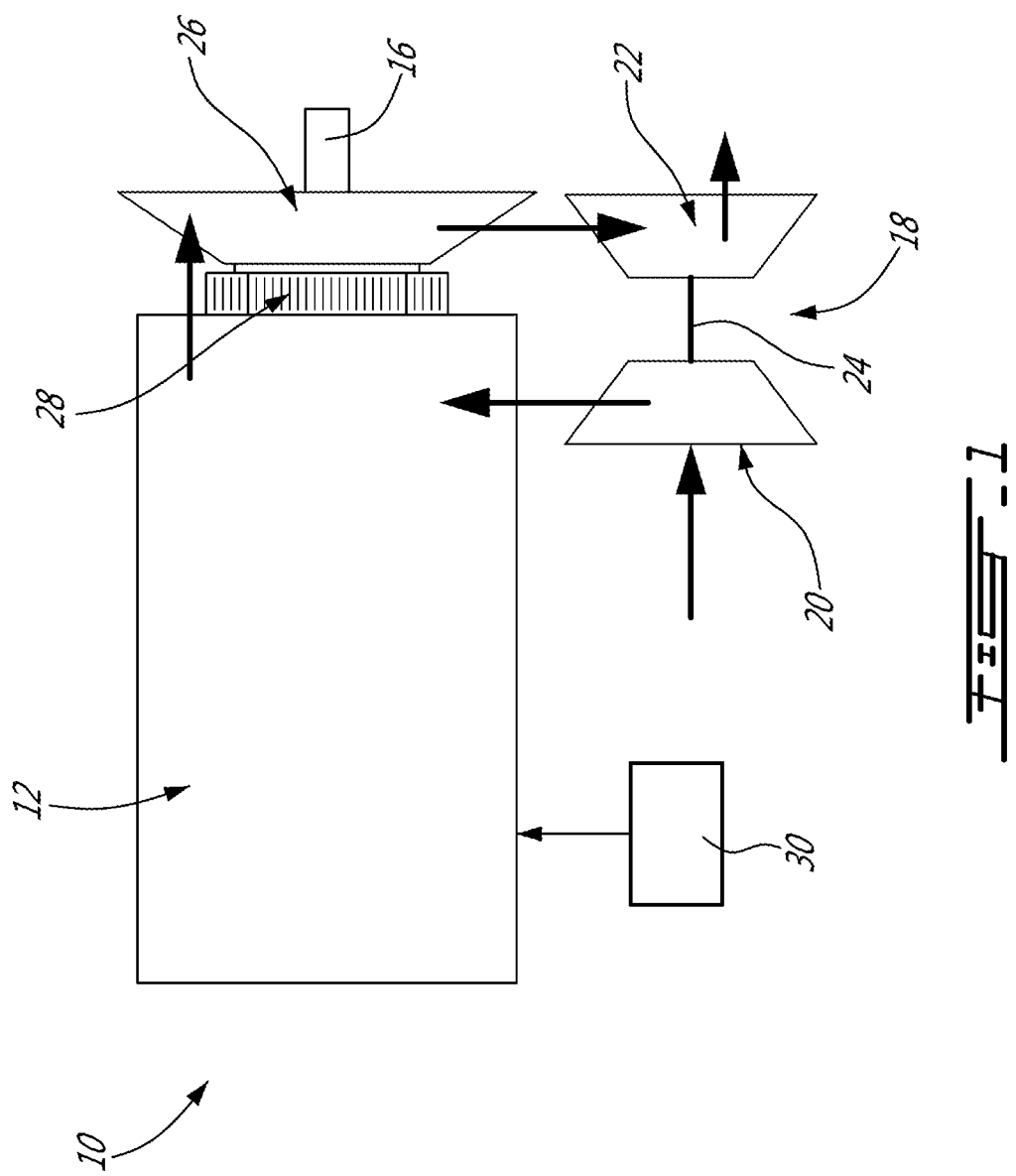
FIG. 1 is a block diagram of a compound engine assembly according to a particular embodiment.

Referring to FIG. 1, a compound engine assembly 10 is schematically shown. The compound engine assembly 10 includes an engine core with one or more internal combustion engine(s) 12. The core engine(s) 12 drive a common load. In the embodiment shown, the common load includes an output shaft 16 which may be for example connected to a propeller through a reduction gearbox (not shown) and to which each core engine 12 is engaged. Other possible common loads may include, but are not limited to, one or more compressor and/or fan rotor(s), electrical generator(s), accessories, rotor mast(s), or any other type of load or combination thereof.

In a particular embodiment, the compound engine assembly 10 also includes a turbocharger 18, including a compressor 20 and a second stage turbine 22 which are drivingly interconnected by a shaft 24. In a particular embodiment, the second stage turbine 22 is a pressure turbine, also known as a reaction turbine. The compressor 20 and the second stage turbine 22 may each be a single-stage device or a multiple-stage device with a single shaft or split on multiple independent shafts in parallel or in series, and may each be a centrifugal or axial device. The compressor 20 of the turbocharger 18 compresses the air before it enters the core engine(s) 12. The compressor 20 and the second stage turbine 22 may each include one or more rotors, with radial, axial or mixed flow blades.

In the embodiment shown, the shaft 24 of the turbocharger 18 rotates independently of the common load. The turbocharger shaft 24 may extends along a different axis than that of the output shaft 16, for example transverse to the output shaft 16, or may be defined coaxially with the output shaft 16; the turbocharger shaft and output shaft 16 may be linked to rotate together, for example through a transmission, or may rotate independently from one another.

Alternately, the turbocharger 18 may be omitted.

Each core engine 12 provides an exhaust flow in the form of exhaust pulses. The exhaust flow from the core engines 12 is supplied to a compound or first stage turbine 26 in fluid communication therewith, also driving the common load. The first stage turbine 26 is configured as a velocity type turbine, also known as an impulse turbine, and could be an axial, radial or mixed flow turbine.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due mostly to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

Aeronautical turbines referred to as impulse turbines typically have a reaction ration of 0.25 (25% reaction) or lower, although other values are also possible.

In a particular embodiment, the first stage turbine 26 is configured to take benefit of the kinetic energy of the pulsating flow exiting the core engine(s) 12 while stabilizing the flow, and the second stage turbine 22 is configured to extract energy from the remaining pressure in the flow. Accordingly, the first stage turbine 26 has a lower (i.e. lower value) reaction ratio than that of the second stage turbine 22.

In a particular embodiment, the second stage turbine 22 has a reaction ratio higher than 0.25; in another particular embodiment, the second stage turbine 22 has a reaction ratio higher than 0.3; in another particular embodiment, the second stage turbine 22 has a reaction ratio of about 0.5; in another particular embodiment, the second stage turbine 22 has a reaction ratio higher than 0.5.

In a particular embodiment, the first stage turbine 26 has a reaction ratio of at most 0.2; in another particular embodiment, the first stage turbine 26 has a reaction ratio of at most 0.15; in another particular embodiment, the first stage turbine 26 has a reaction ratio of at most 0.1; in another particular embodiment, the first stage turbine 26 has a reaction ratio of at most 0.05.

It is understood that any of the above-mentioned reaction ratios for the second stage turbine 22 can be combined with any of the above-mentioned reaction ratios for the first stage turbine 26 and that these ratios can be pressure-based or temperature-based. Other values are also possible.

In the embodiment shown, the first stage turbine 26 is connected to the output shaft 16 through an appropriate type of transmission 28, for example a planetary, star, offset or angular gear system. The outlet of the first stage turbine 26 is in fluid communication with an inlet of the second stage turbine 22. Energy is extracted from the exhaust gas exiting the first stage turbine 26 by the second stage turbine 22 to drive the compressor 20 via the connecting shaft 24.

Although not shown, the air may optionally circulate through an intercooler between the compressor 20 and the core engine(s) 12, and the first stage engine assembly 10 also includes a cooling system, including for example a circulation system for a coolant (e.g. water-ethylene, oil, air) to cool the housing of each core engine 12, an oil coolant for the internal mechanical parts of the core engine(s) 12, one or more coolant heat exchangers, etc.

The fuel injector(s) of each core engine 12, which in a particular embodiment are common rail fuel injectors, communicate with a source 30 of Heavy fuel (e.g. diesel, kerosene (jet fuel), equivalent biofuel), and deliver the heavy fuel into the core engine(s) 12 such that the combustion chamber is stratified with a rich fuel-air mixture near the ignition source and a leaner mixture elsewhere.

Figure 2:
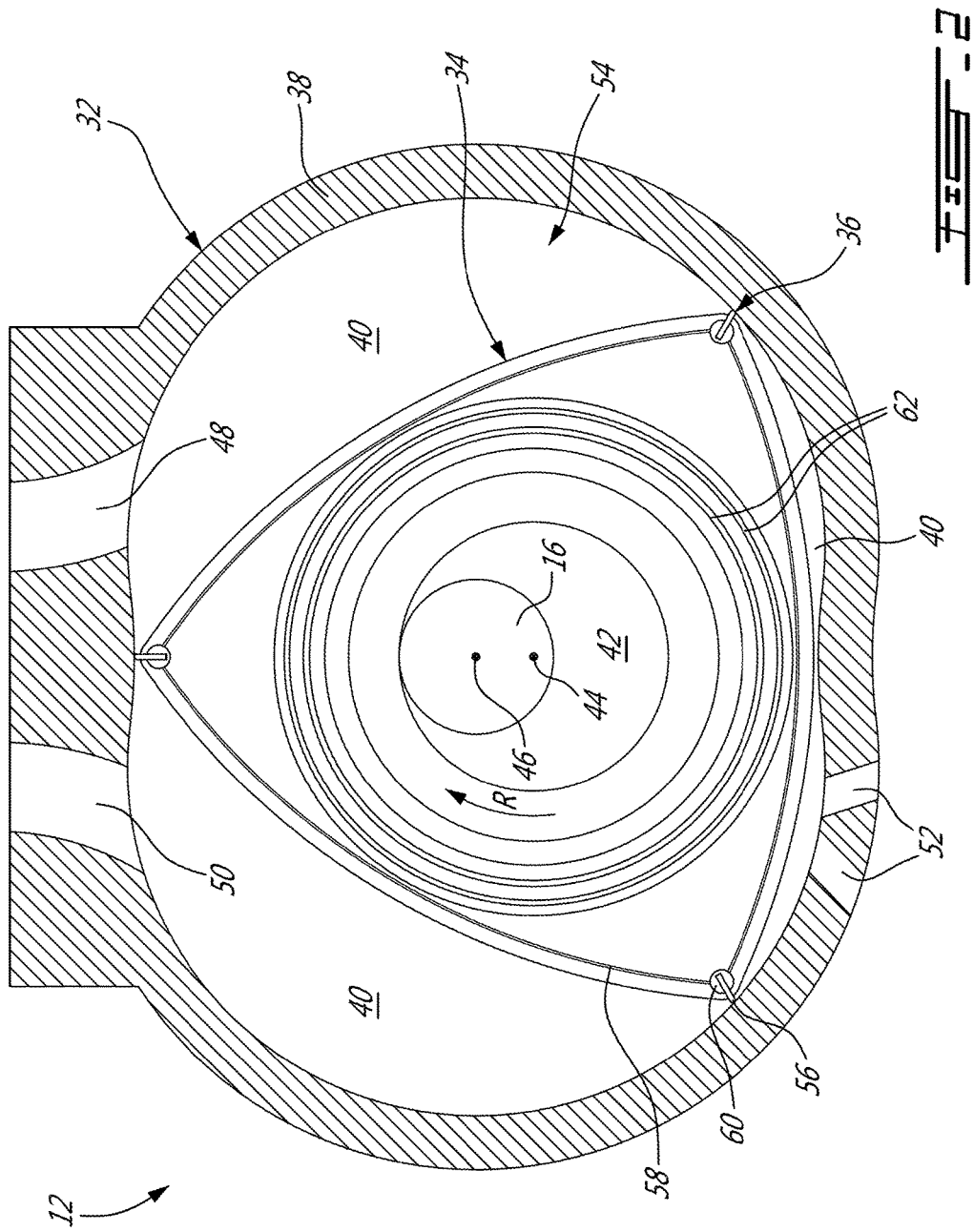
FIG. 2 is a cross-sectional view of a Wankel engine which can be used in a compound engine assembly such as shown in FIG. 1, according to a particular embodiment.

In a particular embodiment, each core engine 12 is a rotary internal combustion engine having a rotor sealingly engaged in a respective housing. In a particular embodiment, the rotary engine(s) is/are Wankel engine(s). Referring to FIG. 2, an exemplary embodiment of a Wankel engine is shown; it is understood that the configuration of the core engine(s) 12 used in the compound engine assembly 10, e.g. placement of ports, number and placement of seals, etc., may vary from that of the embodiment shown. In addition, it is understood that each core engine 12 may be any other type of internal combustion engine including, but not limited to, any other type of rotary engine.

As shown in FIG. 2, each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the internal cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust. The difference between the maximum and minimum volumes of each chamber 40 during the revolutions of the rotor 34 defines a displacement volume Vd of the engine.

An intake port 48 is provided through the peripheral wall 38 for successively admitting compressed air into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation, thus providing for a pulse duty cycle of about 75%. By contrast, a piston of a reciprocating 4-stroke piston engine typically has one explosion per 720° of rotation of the output shaft with the exhaust port remaining open for about 180° of that rotation, thus providing a pulse duty cycle of 25%.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Figure 3:
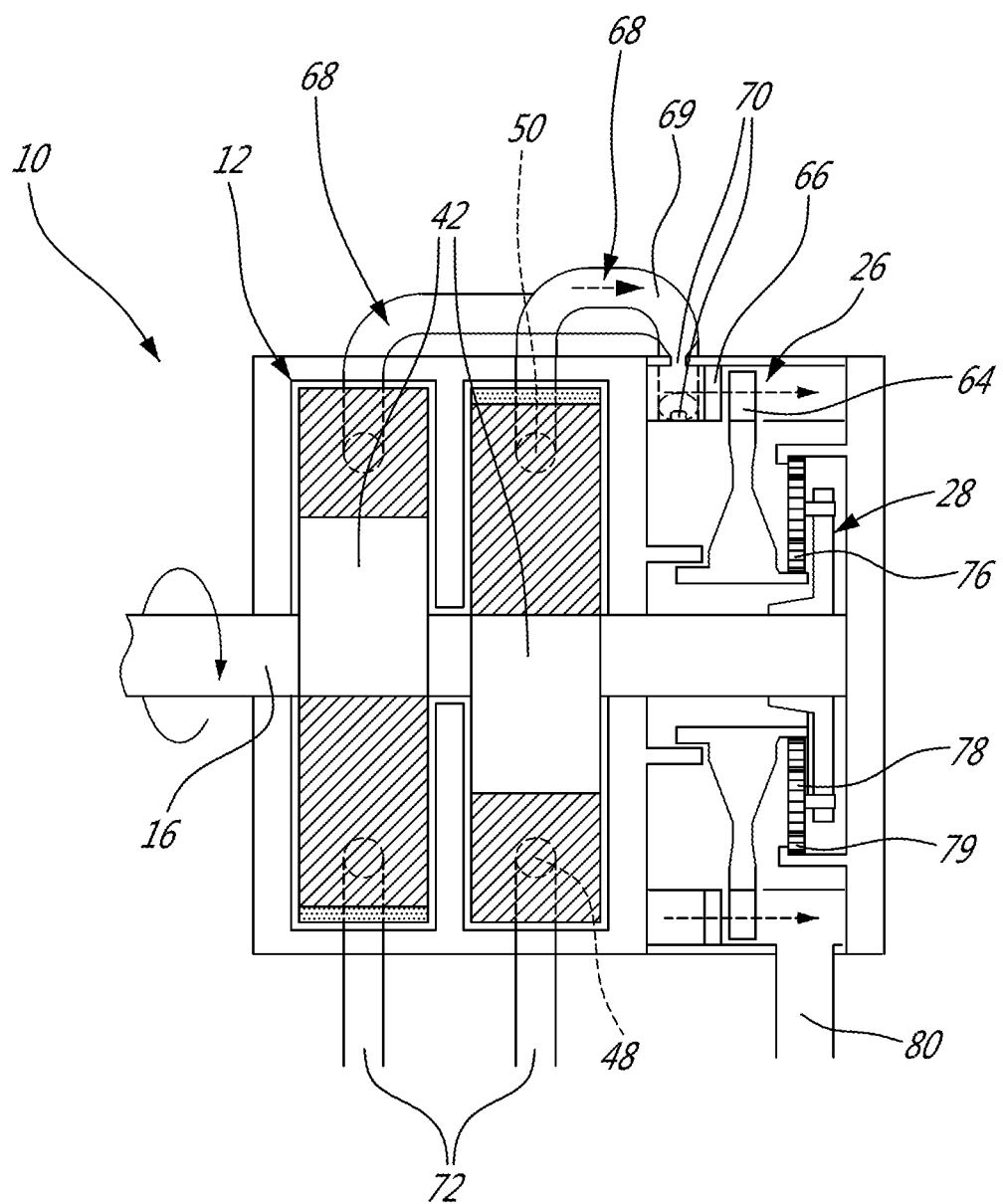
FIG. 3 is a schematic representation of part of the compound engine assembly of FIG. 1 according to a particular embodiment.

Referring to FIG. 3, in a particular embodiment, the compound engine assembly 10 includes two (2) core engines 12 in the form of Wankel engines, for example such as shown in FIG. 2, with the two eccentric portions 42 of the output shaft 16 being angularly offset at 180° from one another for balancing of the compound engine assembly 10.

In other embodiments, more or less core engines 12 may be provided; for example, in another particular embodiment, the core includes four (4) Wankel engines.

In the embodiment shown, the transmission 28 of the first stage turbine 26 includes a sun gear 76 attached on the shaft of the rotor of the first stage turbine 26, and an array of planet gears 78 meshed with the sun gear 76. The planet gears 78 are mounted on a rotating carrier which is drivingly engaged to the output shaft 16. The planet gears 78 are meshed with a stationary ring gear 79. In another embodiment, the planet gears 78 are mounted on a stationary carrier, and are meshed with a ring gear drivingly engaged to the output shaft 16. The speed reduction ratio of the transmission 28 may be selected to optimize operation of the first stage turbine 26 and of the core engines 12. Other configurations are also possible. For example, the first stage turbine 26 may be mounted in an offset manner rather than co-axially with the core engines 12. The first stage turbine 26 may be drivingly engaged to the output shaft 16 through an angular, for example perpendicular, transmission system, for example including a gearbox and a tower shaft.

The rotor blades 64 of the first stage turbine 26 extend across an annular flow path 66. In the embodiment shown, the rotor of the first stage turbine 26 is an axial rotor and the flow path 66 extends axially. Although not shown, in all embodiments, variable geometry elements such as inlet guide vanes, blow-off valves, waste gates, etc. may be used to obtain desired system operability.

The assembly 10 includes an exhaust pipe 68 for each core engine 12. Each exhaust pipe 68 extends from the respective exhaust port 50 (see also FIG. 2) of the respective core engine 12 to a portion of the first stage turbine flow path 66 located upstream of the rotor blades 64, to provide the fluid communication therebetween.

The flow path 66 and/or the outlet of each exhaust pipe 68 are shaped to direct the exhaust pulses onto the blades 64 to allow the exhaust pulses to drive rotation of the rotor of the first stage turbine 26. The exhaust pipes 68 extend independently from one another, and have a relatively small length, which in a particular embodiment allows for increased use of the exhaust pulse kinetic energy to drive the first stage turbine 26. In a particular embodiment, the length of the exhaust pipes 68 is small enough such that the ratio Vp/Vd between the internal volume Vp of each exhaust pipe 68 and the displacement volume Vd of the corresponding core engine 12 is at most 1.5; in another particular embodiment, the ratio Vp/Vd is at most 1.2; in another particular embodiment, the ratio Vp/Vd is at most 1.0.

Shorter exhaust pipes 68 can lead to high pressures at the exhaust pipe outlet; a higher flow pressure cause a higher density of the flow, which leads to a lower flow speed; lower flow speed may in turn lead to lower energy recovery in the first stage turbine 26. In a particular embodiment, this effect is compensated by including a nozzle 70 in the portion of each exhaust pipe 68 defining the communication with the first stage turbine flow path 66. In the embodiment shown, the nozzle 70 is located at the outlet end of the exhaust pipe 68, immediately upstream of the flow path 66. The nozzle 70 defines the minimal cross-sectional area of each exhaust pipe 68. The reduced cross-section of the exhaust pipe 68 defined by the nozzle 70 allows for the flow speed through the nozzle 70 to be increased, which in a particular embodiment allows to obtain improved energy recovery in the first stage turbine 26 with respect to an exhaust pipe 68 of similar length and volume but with a constant cross-section throughout its entire length.

In the embodiment shown, the nozzles 70 and accordingly the communications between the exhaust pipes 68 and the first stage turbine flow path 66 are spaced apart around the circumferential direction of the first stage turbine 26.

In the embodiment shown, the cross-sectional area of each exhaust pipe 68 is constant upstream of the nozzle 70, for example in the portion 69 of the exhaust pipe 68 extending from its communication with the exhaust port 50 to the nozzle 70, and this constant cross-sectional area corresponds to that of the engine exhaust port 50 connected to the exhaust pipe 68. Alternately, the exhaust pipe 68 may have a different cross-sectional area than that of the exhaust port 50, and may be for example smaller than that of the corresponding exhaust port 50.

In a particular embodiment, the ratio An/Ae between the minimum value An of the cross-sectional area of each exhaust pipe 68 at the nozzle 70 and the cross-sectional area Ae of the corresponding exhaust port 50 is at least 0.2. In other embodiments, the ratio An/Ae may be at least 0.4, at most 0.6, from 0.2 to 0.6, or from 0.4 to 0.6. In a particular embodiment, the ratio An/Ae is about 0.5. Other values are also possible.

In addition, an inlet pipe 72 is connected to each intake port 48 (see also FIG. 2), and if a turbocharger is provided, provides fluid communication between the intake port 48 and the outlet of the compressor 20 (FIG. 1). A turbine pipe 80 extends from the flow path 66 of the first stage turbine 26 downstream of the rotor blades 64, and if a turbocharger is provided, provides fluid communication between the first stage turbine 26 exhaust and the inlet of the second stage turbine 22 (FIG. 1).

Accordingly, in a particular embodiment, the internal combustion engine(s) 12 of the engine core are compounded by providing the first stage turbine 26, drivingly engaging each engine 12 and the first stage turbine 26 to a common load, circulating the exhaust gas from each exhaust port 50 through a first portion 69 of the respective exhaust pipe 68, for example having the same cross-sectional area Ae as that of the exhaust port 50, and then through the nozzle 70 having a cross-sectional area An smaller than that of the first portion 69. The exhaust gas is then circulated from the nozzle to the inlet of the first stage turbine 26, and directed onto the blades 64 of its rotor.

Figure 4:
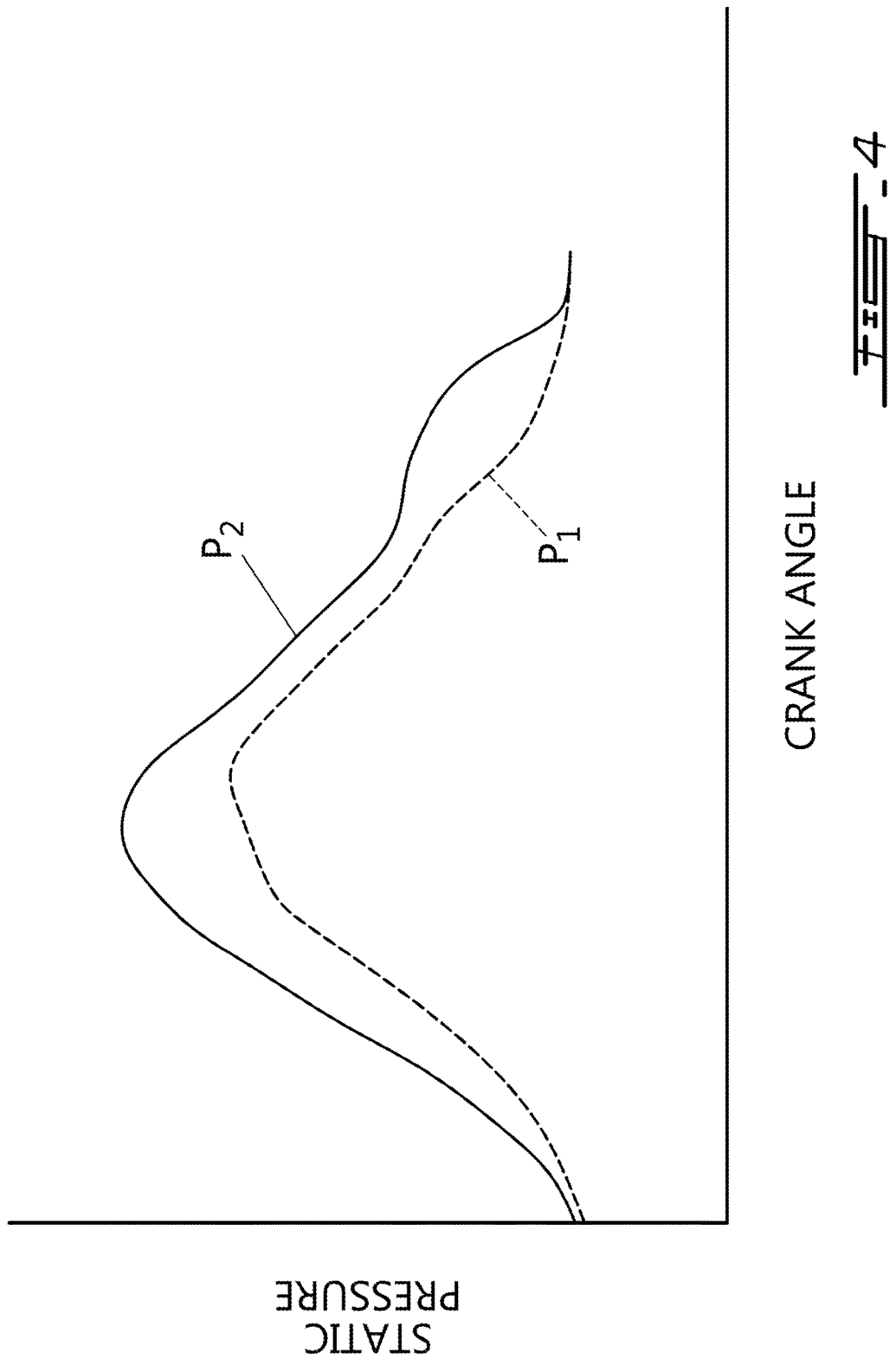
FIG. 4 is a schematic graph of pressure variation with respect to crank angle, for a compound engine including exhaust pipes with a constant cross-sectional area and for a compound engine including exhaust pipes with nozzles as per a particular embodiment.

FIGS. 4-5 show examples of the effect of the presence of the nozzle 70 (reduced cross-sectional area) at the outlet of the exhaust pipe 68. The two graphs show the comparison between two assemblies similar to the assembly 10 described above, the assemblies being identical aside from the configuration of their exhaust pipes 68. Both assemblies include exhaust pipes defining a ratio Vp/Vd of 0.8. In the first assembly, the exhaust pipes include a nozzle at their outlet end defining a ratio An/Ae of 0.95, i.e. the cross-sectional area of the exhaust pipes is not substantially reduced at the connection with the first stage turbine flow path 66. In the second assembly, the exhaust pipes include a nozzle at their outlet end defining a ratio An/Ae of 0.48.

In FIG. 4, the pressure variation with respect to the crank angle of the output shaft 16 is shown. It can be seen that the static pressure pulse $P_1$ of the assembly with the larger exit nozzles (An/Ae of 0.95) is lower than the static pressure pulse $P_2$ of the assembly with the smaller exit nozzles (An/Ae of 0.48); with the larger nozzles, more flow exits the pipe at the beginning of the pulse because of the larger cross-sectional area, and accordingly the pressure build up is less steep.

In FIG. 5, the variation in flow speed (Mach number—MN) at the outlet of the exhaust pipe adjacent the turbine inlet or communication with the first stage turbine flow path 66 with respect to the crank angle of the output shaft 16 is shown. It can be seen that the time during which the speed of the flow is at the maximum value $M_{MAX}$ (which in a particular embodiment corresponds to Mach 1) is longer for the assembly with the smaller exit nozzles (An/Ae of 0.48), as shown by $M_2$, than for the assembly with the larger exit nozzles (An/Ae of 0.95), as shown by $M_1$. Thus, the presence of the reduced cross-sectional area as defined by the smaller nozzles 70 allows for an increase in mean flow speed at the first stage turbine inlet. In a particular embodiment, the flow speed at the turbine inlet $M_2$ of the assembly including the smaller exit nozzles (An/Ae of 0.48) reaches a maximal value $M_{MAX}$ of about Mach 1, and a mean value of about Mach 0.8. Other values are also possible. In a particular embodiment, the larger mean value of flow speed provides for a better performance of the first stage turbine 26, and the larger portion of the full 360 degrees crank angle cycle at the maximal value Mn=1 allows for the transient effects of the pulsating flow in the turbine to be less disturbing and closer to a constant flow turbine, which may yield better efficiency.

In a particular embodiment, the nozzles 70 create equivalent or higher flow speeds at the outlet ends of short exhaust pipes than that obtained at the outlet ends of long exhaust pipes which are sufficiently long to avoid pressure increases leading to flow speed reductions, while avoiding the energy losses associated with the dampening of the exhaust pulses occurring across the length of such long exhaust pipes.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An engine assembly comprising:
    an internal combustion engine having a working chamber of variable volume, the variable volume varying between a minimum volume and a maximum volume with a difference between the maximum and minimum volumes defining a displacement volume Vd;
    a turbine configured as an impulse turbine having a pressure based reaction ratio of at most 0.25, the turbine having a circumferential array of rotor blades extending across a flow path; and
    an exhaust pipe having a pipe volume Vp, the exhaust pipe providing fluid communication between an exhaust port of the internal combustion engine and the flow path of the turbine, the exhaust pipe terminating in a nozzle communicating with a portion of the flow path located upstream of the rotor blades;
    wherein a ratio Vp/Vd between the pipe volume Vp and the displacement volume Vd of the internal combustion engine is at most 1.5; and
    wherein a minimum value of a cross-sectional area of the exhaust pipe is defined at the nozzle.

2. The engine assembly as defined in claim 1, wherein the turbine and the internal combustion engine are in driving engagement with a common load.

3. The engine assembly as defined in claim 1, wherein the ratio Vp/Vd is at most 1.0.

4. The engine assembly as defined in claim 1, wherein the cross-sectional area of the exhaust pipe upstream of the nozzle is constant.

5. The engine assembly as defined in claim 4, wherein the cross-sectional area of the exhaust pipe upstream of the nozzle corresponds to a cross-sectional area of the exhaust port of the internal combustion engine.

6. The engine assembly as defined in claim 1, wherein a ratio An/Ae between the minimum value An of the cross-sectional area at the nozzle and a cross-sectional area Ae of the exhaust port of the internal combustion engine is at least 0.2.

7. The engine assembly as defined in claim 5, wherein the ratio An/Ae is at most 0.6.

8. The engine assembly as defined in claim 5, wherein the ratio An/Ae is at least 0.4.

9. The engine assembly as defined in claim 1, wherein the turbine is a first stage turbine, the assembly further comprising a turbocharger including a compressor and a second stage turbine in driving engagement with one another, an outlet of the compressor being in fluid communication with an inlet port of the internal combustion engine, and an inlet of the second stage turbine being in fluid communication with a portion of the flow path of the first stage turbine located downstream of the rotor blades of the first stage turbine, the second stage turbine having a pressure based reaction ratio higher than the reaction ratio of the first stage turbine.

10. The engine assembly as defined in claim 1, wherein further comprising an additional internal combustion engine and an additional exhaust pipe providing fluid communication between an exhaust port of the additional internal combustion engine and the flow path of the turbine, the nozzle of the exhaust pipe and the nozzle of the additional exhaust pipe being spaced apart from each other along a circumferential direction of the turbine.

11. The engine assembly as defined in claim 1, further comprising a heavy fuel source in communication with the internal combustion engine.

12. An engine assembly comprising:
an internal combustion engine having a working chamber of variable volume, and having an inlet port and an exhaust port in communication with the working chamber, the exhaust port having a cross-sectional area Ae;
a turbine configured as an impulse turbine having a pressure based reaction ratio of at most 0.25, the turbine having a circumferential array of rotor blades extending across a flow path; and
an exhaust pipe providing fluid communication between the exhaust port of the internal combustion engine and the flow path of the turbine, the exhaust pipe terminating in a nozzle communicating with a portion of the flow path located upstream of the rotor blades;
wherein the nozzle includes a portion of reduced cross-sectional area with respect to a remainder of the exhaust pipe, the nozzle defining a minimum cross-sectional area An of the exhaust pipe; and
wherein a ratio An/Ae between the minimum cross-sectional area An and the cross-sectional area Ae of the exhaust port is at least 0.2.

13. The engine assembly as defined in claim 12, wherein the turbine and the internal combustion engine are in driving engagement with a common load.

14. The engine assembly as defined in claim 12, wherein the cross-sectional area of the exhaust pipe upstream of the nozzle is constant.

15. The engine assembly as defined in claim 14, wherein the cross-sectional area of the exhaust pipe upstream of the nozzle corresponds to the cross-sectional area Ae of the exhaust port.

16. The engine assembly as defined in claim 12, wherein the ratio An/Ae is at most 0.6.

17. The engine assembly as defined in claim 16, wherein the ratio An/Ae is at least 0.4.

18. The engine assembly as defined in claim 12, wherein the turbine is a first stage turbine, the assembly further comprising a turbocharger including a compressor and a second stage turbine in driving engagement with one another, an outlet of the compressor being in fluid communication with the inlet port of the internal combustion engine, and an inlet of the second stage turbine being in fluid communication with a portion of the flow path of the first stage turbine located downstream of the rotor blades of the first stage turbine, the second stage turbine having a pressure based reaction ratio higher than the reaction ratio of the first stage turbine.

19. The engine assembly as defined in claim 12, further comprising a heavy fuel source in communication with the internal combustion engine.

20. A method of compounding an internal combustion engine, the method comprising:
providing a turbine configured as an impulse turbine having a pressure based reaction ratio of at most 0.25;
drivingly engaging the internal combustion engine and the turbine to a common load;
circulating exhaust gas from an exhaust port of the internal combustion engine through a first portion of an exhaust pipe having a first cross-sectional area and then through a nozzle of the exhaust pipe having a second cross-sectional area smaller than the first cross-sectional area; and
circulating the exhaust gas from the nozzle to an inlet of the turbine, including directing the exhaust gas onto blades of the turbine.

21. The method as defined in claim 20, wherein a ratio Vp/Vd between a pipe volume Vp of the exhaust pipe and a displacement volume Vd of the internal combustion engine is at most 1.5.

22. The method as defined in claim 20, wherein a minimum value of a cross-sectional area of the exhaust pipe is defined at the nozzle.

23. The method as defined in claim 20, wherein the internal combustion engine is a rotary engine.

* * * * *